United States Patent
John et al.

(10) Patent No.: US 7,626,612 B2
(45) Date of Patent: Dec. 1, 2009

(54) METHODS AND DEVICES FOR VIDEO CORRECTION OF STILL CAMERA MOTION

(75) Inventors: George C. John, Arlington Heights, IL (US); Doina I. Petrescu, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 604 days.

(21) Appl. No.: 11/427,864

(22) Filed: Jun. 30, 2006

(65) Prior Publication Data

US 2008/0004073 A1    Jan. 3, 2008

(51) Int. Cl.
    *H04N 5/228* (2006.01)
(52) U.S. Cl. .................. 348/208.4; 348/208.6
(58) Field of Classification Search ............. 348/208.4, 348/208.6, 208.99, 350, 352; 34/208.14; 396/52, 54, 55; 382/255
    See application file for complete search history.

(56) References Cited

U.S. PATENT DOCUMENTS

| | | | | |
|---|---|---|---|---|
| 5,331,365 | A * | 7/1994 | Miyazawa et al. | 396/51 |
| 5,832,115 | A * | 11/1998 | Rosenberg | 382/199 |
| 5,842,054 | A * | 11/1998 | Suzuki et al. | 396/55 |
| 6,816,156 | B2 * | 11/2004 | Sukeno et al. | 345/207 |
| 6,834,128 | B1 * | 12/2004 | Altunbasak et al. | 382/284 |
| 7,227,565 | B2 * | 6/2007 | Kawahara, Yoshio | 348/14.02 |
| 7,440,634 | B2 * | 10/2008 | Ben-Ezra et al. | 382/255 |
| 7,499,074 | B2 * | 3/2009 | Kim et al. | 348/14.02 |
| 7,522,826 | B2 * | 4/2009 | Nomura et al. | 396/55 |
| 2001/0004269 | A1 | 6/2001 | Shibata et al. | |
| 2004/0130658 | A1 * | 7/2004 | Yamaguchi et al. | 348/375 |
| 2005/0046708 | A1 | 3/2005 | Lim et al. | |
| 2005/0047672 | A1 * | 3/2005 | Ben-Ezra et al. | 382/255 |

(Continued)

FOREIGN PATENT DOCUMENTS

EP    1705875 A2 *    9/2006

(Continued)

OTHER PUBLICATIONS

F. Bourel, C. C. Chibelushi, and A. A. Low, "Robust facial feature tracking," in Proc. 11th British Machine Vision Conf., vol. 1, 2000, pp. 232-241.*

(Continued)

*Primary Examiner*—Jason Chan
*Assistant Examiner*—Gary C Vieaux
(74) *Attorney, Agent, or Firm*—Gary J. Cunningham

(57) ABSTRACT

Disclosed are devices including a mobile imaging device having memory, a video camera system and a still camera system. The video camera system can be configured for video imaging, and configured to generate motion detection output. An application can be stored in memory of the device and configured to process the motion detection output of the video camera system to form motion correction input for the still camera system. The still camera system is configured for still photography imaging and configured to process the motion correction input. Also disclosed are methods of a mobile imaging device including a still camera system and a video camera system. A method includes processing the sequential image data of the video camera system to generate motion detection output, processing the motion detection output to form motion correction input and processing still image correction by the still camera system based on the motion correction input.

21 Claims, 4 Drawing Sheets

U.S. PATENT DOCUMENTS

2005/0094000 A1    5/2005  Son et al.
2005/0237424 A1*  10/2005  Weekamp et al. ........... 348/373
2006/0125938 A1*   6/2006  Ben-Ezra et al. ............ 348/241
2006/0216022 A1*   9/2006  Lee et al. .................... 396/529
2007/0070204 A1*   3/2007  Mentzer ................ 348/207.99

FOREIGN PATENT DOCUMENTS

JP        11298869 A  * 10/1999
WO     WO 0131893  A1  *  5/2001
WO     WO 2004039065 A1 *  5/2004

OTHER PUBLICATIONS

U.S. Appl. No. 11/241,666; filed Sep. 30, 2005; Confirmation No. 6331.

* cited by examiner

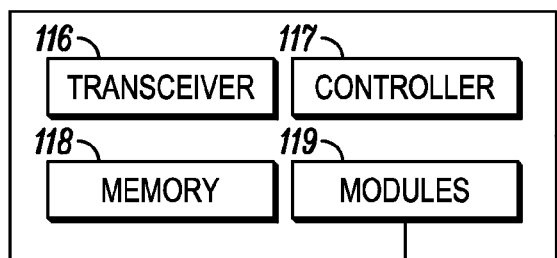
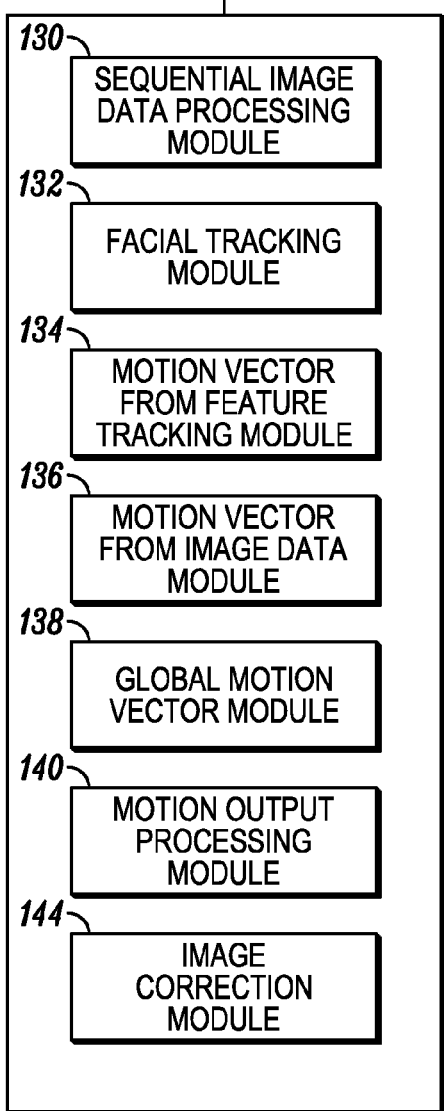
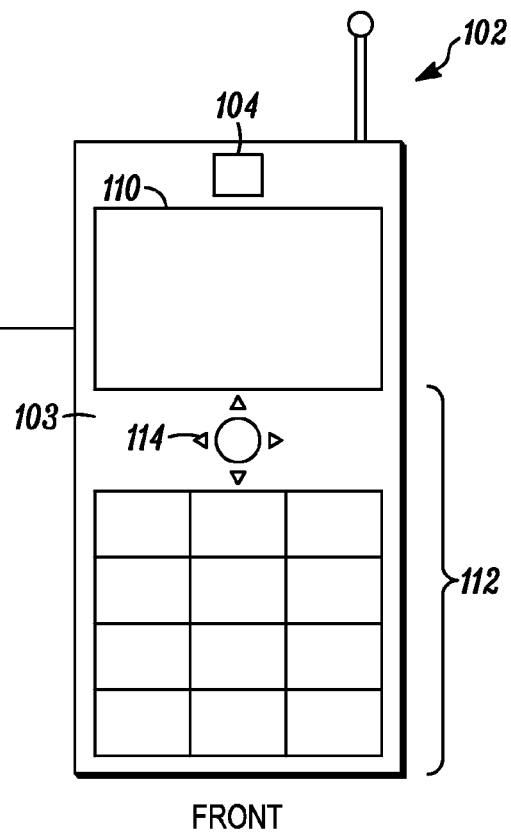
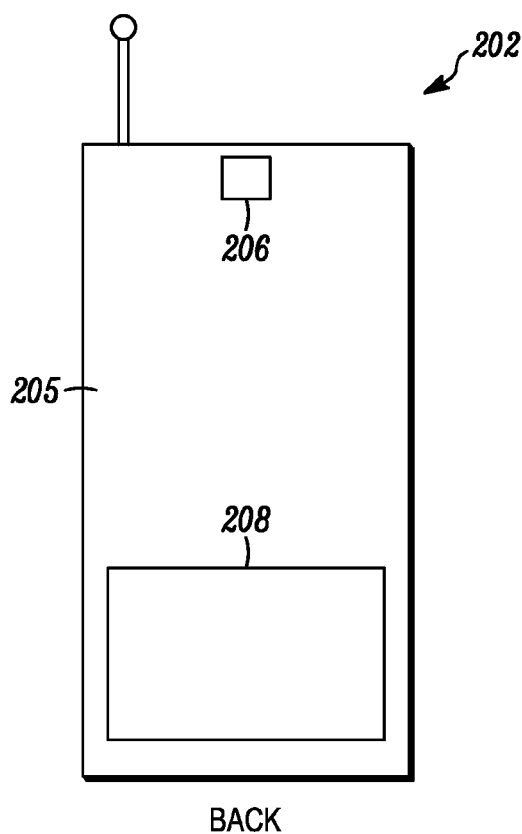
FIG. 1　　FIG. 2

METHODS AND DEVICES FOR VIDEO CORRECTION OF STILL CAMERA MOTION

FIELD

The present disclosure relates to still image capture in mobile communication devices, and more particularly to methods and devices that use video data for motion compensation in a second camera system in a mobile communication device having two cameras.

BACKGROUND

Manufactures of hand held devices, including those of mobile communication devices, are increasingly adding functionality to their devices. For example, many mobile communication devices shipped today include cameras. Image capturing devices, such as still and video digital cameras, are being increasingly incorporated into handheld devices such as wireless communication devices. Handheld device manufacturers, such as mobile communication device manufacturers, can incorporate both still and video digital cameras in one device. Users may capture still and video digital images on their wireless communication devices and transmit a file to a recipient. As advancements are being made in a variety of fields of technology including in image capturing devices, new and improved features are steadily being incorporated into cameras of mobile communication devices.

While there is a trend toward the inclusion of more features and improvements for current features, there is also a trend toward smaller mobile communication devices. As mobile communication device technology has continued to improve, the devices have become increasingly smaller. Fewer and/or smaller hardware and software components are therefore desirable when adding new features and making improvements to the current features in the smaller devices. Fewer hardware components may provide a cost benefit to the consumer.

In a mobile communication device the still and video cameras may point in opposite directions from the device. That is, a video camera for video conferencing may be on the same surface as a display and a keypad including navigation input keys, and therefore may point in the direction of the user while the user views the display. The still camera may point away from the back side of the device. In this manner, when taking a still photograph, the user may view on the display a digitally reproduced image of the user's object, much like the view screen of a digital camera. In a mobile communication device the still and video cameras may point in opposite directions from the device.

It is common that both still and video image sequences are affected by unwanted motion. In particular, hand-shaking introduces undesired motion in still photos and in video captured with cameras incorporated into handheld devices such as cellular telephones. Other causes of unwanted motion can include vibrations, fluctuations or micro-oscillations of the image capturing device.

Both video and still cameras can have motion detecting hardware such as an accelerometer. They also can have motion correction applications to correct for motion of the image of a still camera or to correct for motion of image sequences of a video camera. In a handheld device having a still camera and video camera, it would be beneficial to reduce the number of components required for motion detection and correction in the still camera. In particular, it may be beneficial to improve the speed of the motion correction in a still camera of a handheld device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1 depicts a mobile communication device having a front face and a video camera thereon;

FIG. 2 depicts the back face of a mobile communication device having a still camera;

Figure 3:
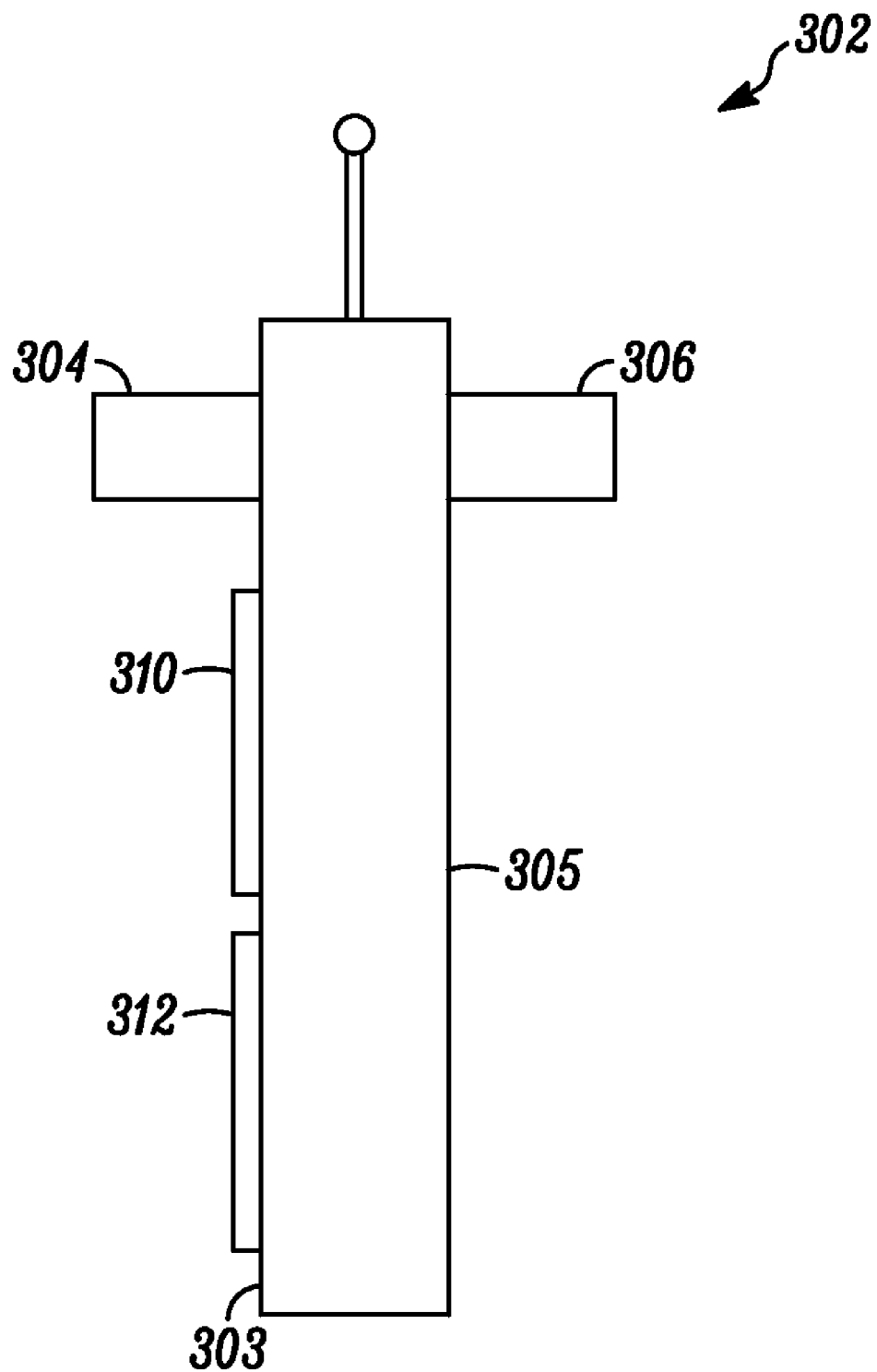
FIG. 3 depicts a side view of a mobile communication device showing a video camera on its front face and a still camera on it back face.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

In a video camera, frame capture can be faster than the still capture, thereby avoiding motion blur better than a still camera. It may be advantageous to use the motion detection and correction of a video camera to compensate for motion in a still photograph. It also may be advantageous to use the motion detection and correction of a video camera to compensate for motion in a second video camera of the device. It may be an improvement in the speed of the motion estimation and thus a correction operation in still photography by a still camera or video photography of a video camera of a handheld device to use the video frame capture feature of another video camera of the same handheld device. In one embodiment of a mobile communication device, a video camera and second camera system may point in opposite directions from the device. For example, when using the still camera of a handheld device, the video camera may be pointed in the direction of the user's face. In one embodiment of the methods and devices as disclosed herein, motion correction methods such as tracking the facial features of the user of the mobile imaging device by the video camera system to generate motion detection output used for motion correction in the still photography. In another embodiment, motion detection based on global motion estimation can generate motion detection output used for motion correction in the still photography. In yet another embodiment, when the handheld device has two video cameras, the described motion detection processes of a first video camera can be applied to a second video camera. The use of hardware such as an accelerometer in a still camera or second video camera may be avoided by an application of motion detection of the first video camera.

Disclosed are devices including mobile imaging devices including a video camera and a still camera or a second video camera. For simplicity in the disclosure below, the second camera system being either a still camera system or a second video camera system will be discussed with reference to the still camera system. It is understood that reference to the still camera system can also apply to a second video camera system.

The video camera system on the opposite side of the housing from the second camera system, is configured for video imaging, and is further configured to generate motion detection output. An application can be stored in memory of the device, the application being configured to process the motion detection output of the video camera system to form motion correction input for the still camera system. The still camera system is configured for still photography imaging and configured to process the motion correction input.

Also disclosed are methods of a mobile imaging device including a still camera system and a video camera system. A method includes processing the sequential image data of the video camera system to generate motion detection output, processing the motion detection output to form motion correction input and processing still image correction by the still camera system based on the motion correction input.

The instant disclosure is provided to further explain in an enabling fashion the best modes of making and using various embodiments in accordance with the present invention. The disclosure is further offered to enhance an understanding and appreciation for the invention principles and advantages thereof, rather than to limit in any manner the invention. The invention is defined solely by the appended claims including any amendments of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

FIG. 1 depicts a mobile communication device 102 having a front face 103 and a video camera 104 thereon. Briefly turning to FIG. 2, that figure depicts the back face 205 of a housing of a mobile communication device 202 having a still camera 206. The battery holder 208 typically on the back of a mobile communication device is also shown. As the device may be used, the video camera 104 may take a close-up or detailed image of a specific object and in particular, a user's face. The still camera 206 may take an image of the user's field of view.

The mobile communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The front face 103 of the mobile communication device 102 can include a display 110, a key pad 112 and a set of navigation keys 114 that can be considered part of the key pad 112. The device can include a transceiver 116, a controller or processor 117, memory 118 and modules 119. While represented as a single processor 117 of the device and a single memory 118 of the device, there may be a plurality of each in the device. Specifically, the video camera 104 and the still camera 206 (see FIG. 2) may have their own associated processors and memories.

Either a central processor 117 or the cameras' processors can receive instructions from the modules 119 which may be stored in any memory of the device. The modules 119 can include a tracking module 130, a facial tracking module 132 a motion vector from feature tracking module 134, a motion vector from image data module 136, a global motion vector module 138, a motion output processing module 140 and an image or sequence of images correction module 144. The modules can carry out certain processes of the methods as described herein. The modules can be implemented in software, such as in the form of one or more sets of prestored instructions, and/or in hardware, which can facilitate the operation of the mobile station or electronic device as discussed below. The modules may be installed at the factory or can be installed after distribution by, for example, a downloading operation. The operations in accordance with the modules will be discussed in more detail below.

FIG. 3 depicts a side view of a mobile communication device 302 showing a video camera 304 disposed its front face 303 and a still camera 306 disposed on its back face 305. The video camera 304 and the still camera 306 can be flush to the front face 303 and the back face 305 respectively. That they are extended from the device faces is for illustration purposes. The video camera 304 and the still camera 306 may also be fixed with respect to the front face 303 and the back face 305 of the housing respectively. The front face 303 is further depicted as similarly showing the display 310 and the keypad 312. In one embodiment, the video camera system 304 is a low resolution video camera system and the still camera system 306 is a high resolution still camera system.

Figure 4:
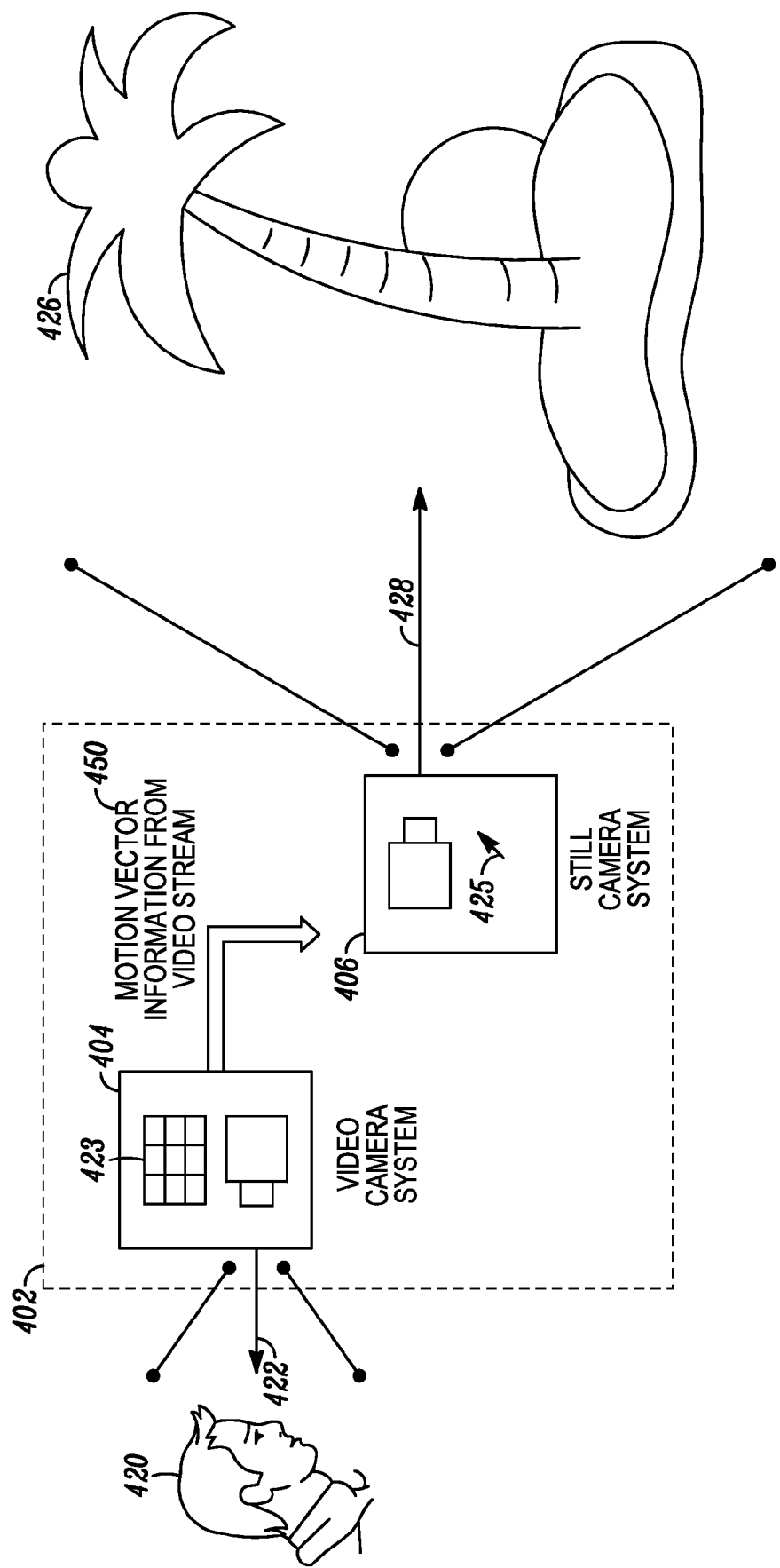
FIG. 4 illustrates a user in the pointing direction of a video camera of a handheld device and a scene or object in the pointing direction of the still camera of the same handheld device.

FIG. 4 illustrates a user 420 in the pointing direction 422 of a video camera 404 of a handheld device 402 and a scene or object 426 in the pointing direction 428 of the still camera of the same handheld device 402. Motion vector information from the video stream 450 of the video camera 404 can be transmitted in a plurality of manners to the still camera 406. For example the video 404 camera may have its own processor and memory to process the motion detection output of the video camera system 404 to form motion correction input for the still camera system 406. In another embodiment a central processor and memory of the handheld device may process the motion detection output of the video camera system 404 to form motion correction input for the still camera system 406. In still another embodiment, the still camera may have its own processor and memory to process the motion detection output of the video camera system 404 to form motion correction input for the still camera system 406.

Accordingly, the video camera system, which is configured for video imaging, may be further configured to generate motion detection output that may be processed by an application stored in memory, the application configured to process the motion detection output of the video camera system to form motion correction input for the still camera system. The still camera system, which is configured for still photography imaging, may be further configured to process the motion correction input.

In any arrangement of processors and memory of the handheld device, a motion detection and correction application or algorithm may be configured to use the video frame capture feature of the video camera to provide motion correction of the still camera. In one embodiment, the facial features of a user may be used to detect motion of the hand held device. The video camera system can generate image frames 423 and an algorithm of the video camera system can be configured to estimate motion vectors between frames and generate a global motion vector which will be discussed in detail below. The global motion vector from the video camera can then be mathematically transformed to represent the movement of the still camera during the capture of the frames. By determining the global motion vectors, and therefore the movement of the video camera, an appropriate motion compensation algorithm may be applied to correct the blur of the still camera.

A controller of the handheld device can be configured to transform the global motion vector generated from image frames 423 of the video camera system to a motion vector of the still camera system to generate a transformed motion vector(s) 425. A controller of the handheld device can be configured to identify a transformed motion vector 425. A controller of the handheld device can processes a motion compensation algorithm based on the transformed motion vector 425 to correct for blur or motion of the still camera 406.

As described previously, an application can be configured to process the motion detection output of the video camera system 404 to form motion correction input for the still camera system 406. Automatic image stabilization can remove the effects of undesired motion (in particular, jitter associated with the movement of one's hand) when capturing video. There are two major effects produced by the inability to hold a hand-held camera in a steady position without mechanical stabilization from, for example, a tripod. First, when taking a still picture of high resolution the image capture takes up to a few seconds and handshaking results in a blurred picture. Second, when capturing a video, handshaking produces undesired global picture movement.

The undesired image motion may be represented as rotation and/or translation with respect to the camera lens principal axis. The frequency of the involuntary hand movement is usually around 2 Hz. As described below in detail, stabilization can be performed for the video background, when a moving subject is in front of a steady background. By evaluation of the background instead of the whole images of the image sequence, unintentional motion can be targeted for stabilization while intentional (i.e. desired) motion may be substantially unaffected. In another embodiment, stabilization can be performed for the video foreground, when it is performed for the central part of the image where the close to perfect in-focus is achieved. A detailed description of the application configured to process the motion detection output of the video camera system to form motion correction input for the still camera system is described in U.S. patent application Ser. No. 11/241,666, filed on 30 Sep. 2005, entitled SYSTEM AND METHOD FOR VIDEO STABILIZATION, and hereby incorporated by reference.

As mentioned above, to determine a global motion vector, methods and circuits for evaluation and stabilization processing can include distinguishing the background from the foreground. The background and the foreground can be distinguished in different manners, a number of which are described herein. In at least one embodiment, the background may be determined by isolating corner sectors of the frames of the sequence of frames and then forming a background pixel domain to correspond to the corner sectors. A predetermined number of background pixel domains, such as corner sectors, may be included.

An image sequence generated by the video camera can be stabilized to freeze motion. The image sequence can be formed from a temporal sequence of frames, each frame having an area. The images are commonly two dimensional arrays of pixels. As mentioned above, the area of the frames generally can be divided into a foreground area portion and background area portion. From the background area portion of the frames, a background pixel domain is selected for evaluation. The background pixel domain is used to generate an evaluation, for subsequent stabilization processing, calculated between corresponding pairs of a sub-sequence of select frames. In one embodiment, the corner sectors of the frames of the sequence of frames are determined and the background pixel domain is formed to correspond to the corner sectors.

Apparent displacement between pixel arrays in the background pixel domain of a temporal sequence of frames is an indication of motion. Such apparent displacement can be determined by a calculation of horizontal and vertical displacement vectors. By considering displacement of the background pixel domain instead of the entire area, low computational complexity can be provided. In stabilization, the result of the background pixel domain displacement calculations can then be translated into global motion vectors to be applied to the image as a whole for the sequence of frames. Applying stabilization processing based on the background evaluation includes calculating a global motion vector for application to the frames. Calculating the global motion vector includes determining an average of middle range values for the vertical displacements components and an average of middle range values for the horizontal displacement components. The global motion vector can also include rotation in addition to translation along the three axes. Accordingly, there could be six components even though it may be preferable to estimate the X and Y components of a video stream if facial feature tracking is not available.

As described in detail above, global motion vectors can be defined as two dimensional (horizontal and vertical) displacements or in three dimensional displacements (including a z-axis) from one frame to another, evaluated from the background pixel domain by considering sub-images. Using facial tracking, estimation may be processed using all or some of the six components mentioned above. Furthermore, an error criterion is defined and the value of this criterion is determined for different motion vector candidates. The candidate having the lowest value of the criterion can be selected as the result for a sub-image. The most common criterion is the sum of absolute differences. A choice for motion vectors for horizontal and vertical directions can be calculated separately, and a global two dimensional or three dimensional motion vector can be defined using these components.

For example, the median horizontal value, among the candidates chosen for each sub-image, and the median vertical value, among the candidates chosen for each sub-image, can be chosen as the two components of the global motion vector. The global motion can thus be calculated by dividing the image into sub-images, calculating motion vectors for the sub-images and using an evaluation or decision process to determine the whole image global motion from the sub-images. The images of the sequences of images can be accordingly shifted, a portion or all of the outer boundary being eliminated, to reduce or eliminate unintentional motion of the image sequence. Stabilization processing, either by a processor of the video camera 404, a central processor 117 (see FIG. 1) or a processor of the still camera 406, can be applied based on the above-described evaluation of the frames in the sequence of frames captured by the video camera 404.

Depending on the orientation of the still camera with respect to the video camera, a geometric transform can be computed to estimate the movement of the still camera corresponding to a known video camera movement. The computed still camera motion vector can then be used in a variety of mathematical algorithms such as deconvolution to correct for motion blur.

Figure 5:
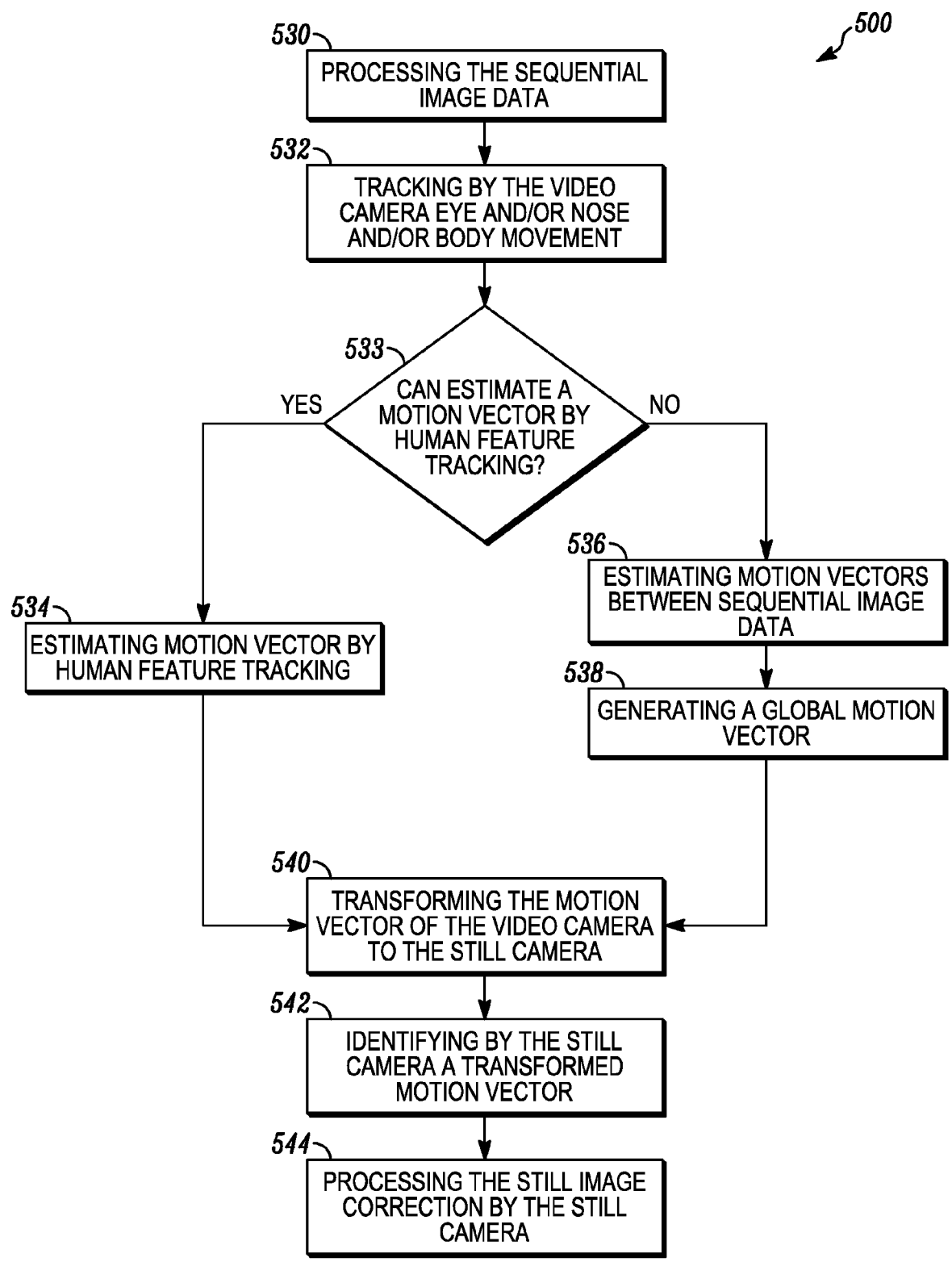
FIG. 5 is a flow chart illustrating an embodiment of a method as described herein.

FIG. 5 is a flowchart illustrating an embodiment of the method 500 as described above. As described herein, the motion detection can be based on facial feature tracking or a global estimation. It is understood that other motion detection and correction processes are within the scope of this discussion as well. In any event, processing sequential image data to generate motion detection output is initiated 530 in accordance with sequential image data processing module 130 (see FIG. 1).

Tracking by the video camera of eye and/or nose and/or body movement is processed 532. The movement of facial features of a user may be tracked by the video camera system 404 (see FIG. 4). The movement of facial features such as the eyes and/or the nose, or the movement of the head or other body motions may be tracked to generate motion detection output in accordance with the facial tracking module 132 (see FIG. 1). To process facial or body movement, multiple video frames and generic models can be used to construct quadrilateral or rectangular 3D mesh tracking of a subject such as a user whose image is being captured by the video camera pointing in his or her direction. Real-time motion vectors provided by standard video encoders are used to estimate and track several defined points on the mesh. With this data, positions and expressions of the subject are tracked in real-time to determine their body and facial movements.

There can be a determination as to whether a motion vector can be estimated by tracking the human features 533 as described above. If the outcome is positive, then the motion vector can be estimated by the human feature tracking 534 in accordance with a module to generate a motion vector from the feature tracking 134 (see FIG. 1). If the outcome is negative then the motion vector can be estimated between sequential image data 536 in accordance with a module to generate a motion vector from the sequential image 136. A global motion vector can be generated 538 in accordance with the global motion vector module 138.

The feature tracking motion vector 534 or the global motion vector 538 can be transformed into a motion vector of the still camera system to generate a transformed motion vector for still image correction 540 in accordance with motion output processing module 140. The still image correction then can include identifying by the still camera system a transformed motion 542. Image correction can be processed by the still camera system based on the motion correction input 544 in accordance with the image motion correction module 144 (see FIG. 1).

In a handheld device including video and still cameras, a motion correction application of the video camera can be applied to image blur caused by motion of the still camera. A plurality of motion correction applications are described above. It is understood that any motion correction applications of the video camera may be applied to the image blur caused by motion of the still camera, including those having hardware solutions. The use of the motion correction of the video camera may improve the speed of the motion correction of the still camera or a second video camera. Accordingly, hardware for the still camera may be eliminated from the device.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitable entitled.

The invention claimed is:

1. A mobile imaging device having memory, a video camera system and a second camera system, the device comprising:
   the video camera system configured for video imaging, the video camera system configured to generate motion detection output;
   an application stored in memory, the application configured to process the motion detection output of the video camera system to form motion correction input for the second camera system; and
   the second camera system configured for still photography imaging, the second camera system configured to process the motion correction input; and
   a housing of the mobile imaging system comprising at least two sides, wherein the video camera system is disposed on a first side of the two sides and the second camera system is disposed on a second side of the two sides, the first side and the second side are opposite sides, facing in opposite directions.

2. A device as recited in claim 1, wherein the still camera is configured to apply the application to receive motion detection output of the video camera system and generate motion correction input.

3. A device as recited in claim 1, further comprising:
   a controller configured to apply the application to receive motion detection output of the video camera system and generate motion correction input.

4. The device of claim 1, wherein the video camera system on the first side is fixed with respect to the second camera system on the second side.

5. The device of claim 1, wherein the video camera system is a low resolution video camera system and the camera system is a high resolution second camera system.

6. The device of claim 1, wherein the video camera system generates image frames and wherein the video camera system is configured to estimate motion vectors between frames and generate a global motion vector.

7. The device of claim 6, wherein the controller is configured to transform the global motion vector of the video camera system to a motion vector of the camera system to generate a transformed motion vector.

8. The device of claim 7, wherein the camera system is configured to identify a transformed motion vector.

9. The device of claim 1, wherein the second camera system processes a motion compensation algorithm to correct for blur.

10. The device of claim 1, wherein a user of the mobile imaging device comprises facial features, the video camera system configured to detect motion by tracking movement of the facial features to generate motion detection output.

11. The device of claim 1, wherein the second camera system is a still camera or a video camera.

12. A method of a mobile imaging device comprising a video camera system and a second camera system, the method comprising:
   processing the sequential image data of the video camera system to generate motion detection output;
   processing the motion detection output to form motion correction input;
   processing image correction for the second camera system based on the motion correction input;
   providing a housing of the mobile imaging system including a first side and a second side;
   disposing the video camera system on the first side to point in a first direction; and
   disposing the second camera system on the second side to point in a second direction, the first side and the second side are opposite sides, facing in opposite directions.

13. The method of claim 12, wherein the motion detection output comprises:
   estimating motion vectors between sequential image data; and
   generating a global motion vector.

14. The method of claim 13, wherein processing the motion detection output to form motion correction input comprises:
   transforming by the controller the global motion vector to a motion vector of the second camera system to generate a transformed motion vector.

15. The method of claim 12, wherein processing still image correction comprises:
   identifying by the second camera system a transformed motion vector.

16. The method of claim 12, wherein a user of the mobile imaging device comprises facial features, the method comprising:
   tracking by the video camera system the movement of the facial features to generate motion detection output.

17. The method of claim 12 wherein the second camera system is a still camera or a video camera.

18. A mobile imaging device having a video camera system and a second camera system, the device comprising:
   a motion detection module configured to generate motion detection output based on a video sequence captured on motion of the video camera system;
   a motion correction module configured to receive the motion detection output and form motion correction input for the second camera system; and
   a housing of the mobile imaging system comprising at least two sides, wherein the video camera system is disposed on a first side of the two sides and the second camera system is disposed on a second side of the two sides, the first side and the second side are opposite sides, facing in opposite directions.

19. The device of claim 18, wherein:
   the motion detection output is based on formulation of a global motion vector generated from sequential image frames captured by the video camera system; and
   the motion correction input is based on the formulation of a transformed motion vector based on the global motion vector.

20. The device of claim 18, wherein a user of the mobile imaging device comprises facial features, the device further comprising:
   a facial feature tracking module of the video camera system the movement of the facial features to generate motion detection output.

21. The device of claim 18 wherein the second camera system is a still camera or a video camera.

\* \* \* \* \*